Patented Nov. 14, 1944

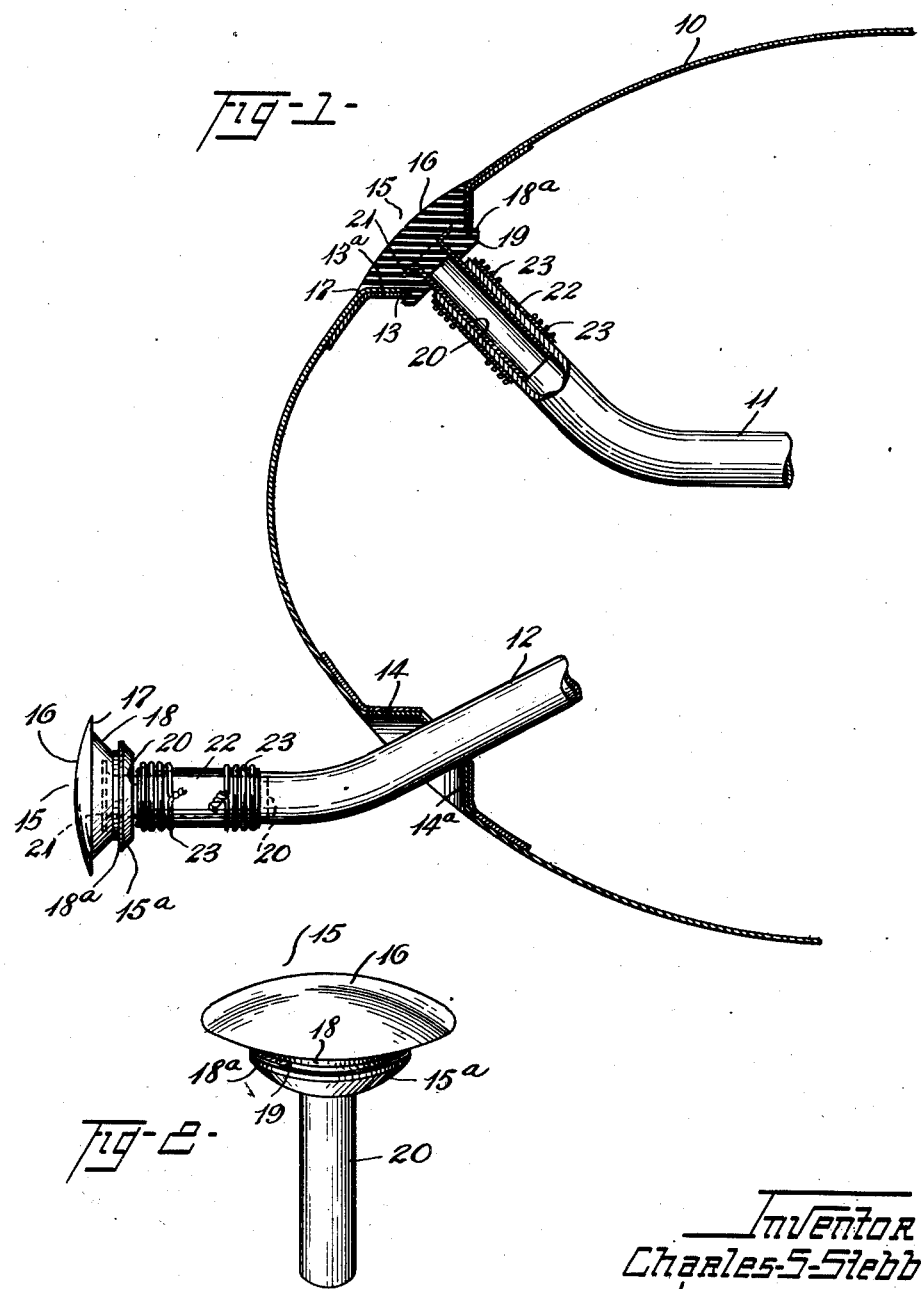

2,362,675

UNITED STATES PATENT OFFICE 2,362,675

DETACHABLE PLUG

Charles S. Stebbins, Akron, Ohio, assignor to The B. F. Goodrich Company, New York, N. Y., a corporation of New York Application December 24, 1942, Serial No. 470,109

5 Claims. (Cl. 138—89)

This invention relates to plugs and especially to detachable plugs suitable for mounting in an aperture and for connecting to a conduit.

Aircraft of the heavier-than-air class operating under winter or other weather conditions conducive to the formation of ice may be equipped with inflatable protective coverings for preventing the accumulation of ice upon their airfoils, such for example, as the wings and the tail empennage, and these protective coverings may be removed during operations under summer weather conditions. However, upon the removal of such coverings, the fluid conduits which are disconnected from the coverings, are disposed wholly within the airfoils and sealed against the leakage of fluid and the entrance of dirt or other objectionable substances. The aerodynamic efficiency of the wings and other airfoils desirably should be maintained by closing the apertures in the airfoil surface covering through which the fluid conduits extend to the protective covering and preferably closing the apertures in a manner whereby the creation of turbulent air flow is prevented at the region where the protective covering has been removed.

Objects of the invention are to provide for mounting a plug in an aperture in a wall in a detachable manner while providing for connecting the plug to a fluid conduit, to provide for sealing the aperture against the leakage of fluid together with closing the end of the conduit, to provide a plug capable of elastically gripping the margin of the aperture while providing flexibility of attachment to the conduit, and to provide for convenience of manufacture, simplicity of construction, and effectiveness of operation.

Specific objects of the invention are to provide for sealing an aperture in an airfoil while maintaining the aerodynamic efficiency of the airfoil, to provide for disposing fluid conduits within the airfoil in a manner facilitating access thereto and withdrawal therefrom through the aperture in the airfoil, and to provide a resilient plug adapted to conform smoothly to the curvature of the surface of the airfoil.

These and other objects and advantages of the invention will be apparent from the following description. In the accompanying drawing, which forms a part of this specification, and in which like numerals are employed to designate like parts throughout the same:

Fig. 1 is a view showing a detachable plug in assembled and disassembled arrangement with an airfoil and constructed in accordance with and embodying the invention, parts being broken away and in section, and Fig. 2 is a perspective view of the plug.

When the inflatable protective covering for preventing the accumulation of ice on an airfoil 10 or wing skin is removed, fluid conduits 11 and 12, which may be of a reinforced rubber hose construction, are drawn through apertures 13 and 14, and are disconnected from the protective covering. The invention provides a detachable plug 15 which effectively closes the end of the hose 11 or 12 and effectively seals the aperture 13 or 14 in the wing skin 10.

The detachable plug 15 comprises a tube 20 of stiff material, such as steel, and an annular body 15a which is of resilient rubber or other rubber-like material, preferably molded, and is adapted to conform generally to the curvature of the airfoil or wing skin 10. The plug 15 has a portion 16 generally rounded in section and including a sealing lip 17 for contacting the margin 13a or 14a of the aperture 13 or 14, a second portion 18 embracing the margin 13a or 14a and including a recess 19 for seating the margin 13a or 14a, and the tube 20, preferably cylindrical, secured at the second portion 18 and having, preferably, a flanged end 21 molded integral with the annular body 15a. The fluid conduit 11 or 12 is connected telescopically to the steel tube 20 thus joining, effectively, the annular body 15a to the fluid conduit or rubber hose 11 or 12. The second portion 18 elastically grips the margin 13a or 14a and permits detachable engagement of the annular body 15a at the margin 13a or 14a to the wing skin 10. The second portion 18 is, desirably, substantially frusto-conical in section for contacting the margin 13a or 14a of the aperture 13 or 14 which, as shown in Fig. 1, may be dimpled or counter-sunk. The recess 19 permits seating the margin 13a or 14a therein and a shoulder 18a enables embracing and contacting the margin for assisting in preventing accidental disengagement of the plug 15 with the wing skin 10.

Inasmuch as the steel tube 20 is molded in the annular body 15a some flexibility of the attachment of the conduit 11 or 12 is permitted by virtue of the resiliency of the rubber-like material. Vibration of the conduit does not tend to loosen the annular body 15a from engagement with the margin 13a or 14a of the aperture 13 or 14 because of the resilient connection of the tube and the body.

When the annular body 15a is engaged with the margin 13a or 14a of the wing skin 10, the portion 16 generally rounded in section readily conforms generally to the curvature of the wing skin and, since the sealing lip 17 terminates in a thin edge, a smooth contour is provided over the aperture 13 or 14 thereby preventing objectionable turbulent flow of air over the airfoil 10, hence maintaining the aerodynamic efficiency of the latter.

In the operation and use of the detachable plug 15 after the inflatable protective covering has been removed, the steel tube 20 is inserted in the end of the conduit 11 or 12 and a suitable adhesive such as rubber cement may be used, if desired, to secure a good bond between the steel tube 20 and the wall of the conduit 11 or 12. It is desirable that friction tape 22 be wound around the conduit at the region of telescopic engagement between the steel tube 20 and the conduit 11 or 12 to protect the wall of the conduit, and then safety wire 23 is wound around the conduit at this region to further secure the attachment of the conduit to the steel tube. In this manner the fluid conduit is attached, effectively, to the detachable plug 15, when the conduit is not connected to the inflatable protective covering.

Upon completion of securing the conduit 11 or 12 to the detachable plug 15, the conduit is pushed through the aperture 13 or 14 and the annular body 15a is forced into the aperture 13 or 14 until the sealing lip 17 contacts the wing skin 10 and the margin 13a or 14a is seated in the recess 19 of the annular body 15a. The annular body 15a elastically grips the margin 13a or 14a by virtue of the resiliency of the material. The detachable plug 15 may be removed by raising the sealing lip 17 and pulling outwardly from the wing skin 10. The invention thus facilitates disposal of the fluid conduits within the airfoil and permits convenient access to the conduits for reconnection to the protective covering whenever required.

Variations may be made without departing from the scope of the invention as it is defined in the following claims.

I claim:

1. A detachable plug for mounting in an aperture in a wall and for connecting to a conduit, said detachable plug comprising a closed body having a flexible flange for contacting the margin of said aperture, an elastic portion opposite said flexible flange for elastically gripping the margin of said aperture, and means projecting from said elastic portion for connecting said body to said conduit.

2. A detachable plug for mounting in an aperture in a wall and for connecting to a conduit, said detachable plug comprising a body presenting a closed face and having a sealing lip for contacting the margin of said aperture, a flexible portion including a recess for seating said margin, and means comprising a tubular extension projecting from said body at the side opposite the closed face of the latter for connecting said body to said circuit.

3. A detachable plug for mounting in an aperture in a wall and for connecting to a conduit, said detachable plug comprising a body presenting a closed face and having an annular flexible flange for contacting the margin of said aperture, a flexible portion for embracing said margin between its outer edge and said flange, and a tubular end portion comprising a metal tube embedded in said plug and projecting from said body at the side opposite the closed face of the latter for connecting said body to said conduit.

4. A detachable plug for mounting in an aperture in a curved wall of thin material and for connecting to a conduit, said detachable plug comprising a body of resilient rubber-like material adapted to conform to the curvature of said wall, said body having a portion generally rounded in section and including a sealing lip for contacting the margin of said aperture, a second portion adjacent the first said portion embracing said margin and having a recess for seating said margin, and a hollow end portion for connecting said body telescopically with said conduit.

5. A detachable plug for mounting in an aperture in a curved wall of thin material and for connecting to a conduit, said detachable plug comprising a molded annular body of resilient rubber-like material adapted to conform to the curvature of said wall and a cylindrical tube of stiff material adapted to be telescopically connected with the end of said conduit, said cylindrical tube having a flanged end molded integral with said annular body, said annular body comprising a portion generally rounded in section and including a sealing lip for contacting the margin of said aperture and a second portion embracing said margin and including a recess for seating said margin.

CHARLES S. STEBBINS.